United States Patent
Bui et al.

(10) Patent No.: US 11,567,981 B2
(45) Date of Patent: Jan. 31, 2023

(54) MODEL-BASED SEMANTIC TEXT SEARCHING

(71) Applicant: Adobe Inc., San Jose, CA (US)

(72) Inventors: Trung Bui, San Jose, CA (US); Yu Gong, San Jose, CA (US); Tushar Dublish, Uttar Pradesh (IN); Sasha Spala, Arlington, MA (US); Sachin Soni, New Delhi (IN); Nicholas Miller, Boston, MA (US); Joon Kim, Dublin, CA (US); Franck Dernoncourt, Sunnyvale, CA (US); Carl Dockhorn, San Jose, CA (US); Ajinkya Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 239 days.

(21) Appl. No.: 16/849,885

(22) Filed: Apr. 15, 2020

(65) Prior Publication Data
US 2021/0326371 A1   Oct. 21, 2021

(51) Int. Cl.
*G06F 40/30* (2020.01)
*G06F 16/33* (2019.01)
(Continued)

(52) U.S. Cl.
CPC .......... *G06F 16/3347* (2019.01); *G06F 40/30* (2020.01); *G06N 5/04* (2013.01); *G06N 20/00* (2019.01)

(58) Field of Classification Search
CPC .. G06F 16/3347; G06F 40/30; G06F 16/3344; G06F 40/284; G06F 16/338;
(Continued)

(56) References Cited

U.S. PATENT DOCUMENTS

| 8,463,810 B1 * | 6/2013 | Rennison | G06F 16/335 |
| | | | 707/723 |
| 11,100,293 B2 * | 8/2021 | Guo | G06F 40/289 |
| (Continued) | | | |

OTHER PUBLICATIONS

Balikrishnan, V. et al., "Stemming and Lemmatization: A Comparison of Retrieval Performances," Lecture Notes on Software Engineering, vol. 2, No. 3, Aug. 2014, pp. 262-267.
(Continued)

*Primary Examiner* — Abdelali Serrou
(74) *Attorney, Agent, or Firm* — Nicholson De Vos Webster & Elliot LLP

(57) ABSTRACT

Techniques and systems are described for performing semantic text searches. A semantic text-searching solution uses a machine learning system (such as a deep learning system) to determine associations between the semantic meanings of words. These associations are not limited by the spelling, syntax, grammar, or even definition of words. Instead, the associations can be based on the context in which characters, words, and/or phrases are used in relation to one another. In response to detecting a request to locate text within an electronic document associated with a keyword, the semantic text-searching solution can return strings within the document that have matching and/or related semantic meanings or contexts, in addition to exact matches (e.g., string matches) within the document. The semantic text-searching solution can then output an indication of the matching strings.

15 Claims, 12 Drawing Sheets

(51) Int. Cl.
*G06N 20/00* (2019.01)
*G06N 5/04* (2006.01)

(58) Field of Classification Search
CPC .. G06F 16/3334; G06F 40/205; G06F 16/345; G06F 16/93; G06F 16/90344; G06F 40/279; G06F 40/216; G06F 40/289; G06F 16/248; G06F 40/20; G06F 40/242; G06F 40/56; G06F 40/295; G06F 16/334; G06F 16/953; G06N 5/04; G06N 20/00; G06N 3/084; G06N 3/088; G06N 3/0454
See application file for complete search history.

(56) References Cited

U.S. PATENT DOCUMENTS

| | | | | |
|---|---|---|---|---|
| 11,222,183 | B2* | 1/2022 | Downs | G06F 40/289 |
| 11,238,211 | B2* | 2/2022 | van de Kerkhof | G06F 40/30 |
| 11,308,320 | B2* | 4/2022 | Lee | G06F 40/226 |
| 2006/0106767 | A1* | 5/2006 | Adcock | G06F 40/247 |
| 2012/0191716 | A1* | 7/2012 | Omoigui | H01L 27/14647 707/E17.069 |
| 2017/0083508 | A1* | 3/2017 | Dixon | G06F 40/58 |
| 2017/0315998 | A1* | 11/2017 | Byron | G06F 40/30 |
| 2018/0052928 | A1* | 2/2018 | Liu | G06F 16/951 |
| 2018/0121768 | A1* | 5/2018 | Lin | G06K 9/6271 |
| 2019/0155913 | A1 | 5/2019 | Singal et al. | |
| 2019/0164022 | A1 | 5/2019 | Linton et al. | |

OTHER PUBLICATIONS

Miller, George A., "WordNet: A Lexical Database for English," Communications of the ACM, vol. 38, No. 11, Nov. 1995, pp. 39-41.

Page, L. et al., "The PageRank Citation Ranking: Bringing Order to the Web," Technical Report. Stanford InfoLab, Jan. 29, 1998, 17 pages.

Ramos, Juan, "Using TF-IDF to Determine Word Relevance in Document Queries," Jan. 2003, 4 pages.

Bast et al., "Broccoli: Semantic full-text search at your fingertips", arXiv preprint arXiv, 2012, 1207.2615.

Examination Report, AU App. No. 2021200962, dated Feb. 10, 2022, 7 pages.

Mikolov et al., "Efficient Estimation of Word Representations in Vector Space", arXiv, 2013, 1301.3781.

* cited by examiner

502

The brown bear is a bear species that is found across much of northern Eurasia and North America. In North America, the populations of brown bears are often called "grizzly bears".

504

| | Brown bear |
|---|---|
| The | Bear species |
| Brown | North America |
| Bear | Grizzly bears |
| Is | |
| A | |
| Species | |
| That | |
| Found | |
| Across | |
| Much | |
| Of | |
| Northern | |
| Eurasia | |
| And | |
| North | |
| America | |
| In | |
| Populations | |
| Are | |
| Often | |
| Called | |
| Grizzly | |
| Bears | |

FIG. 5

| PAGES | TOKEN GENERATION TIME (ms) | TOKEN PAYLOAD (KB) | TOTAL SEARCH TIME (ms) |
|---|---|---|---|
| 1 | 16 | 2 | 270 |
| 15 | 83 | 15 | 320 |
| 50 | 800 | 32 | 350 |
| 100 | 1400 | 48 | 400 |
| 448 | 10500 | 114 | 600 |
| 756 | 13000 | 137 | 600 |

1000

DETECT INPUT CORRESPONDING TO A REQUEST TO LOCATE TEXT WITHIN AN ELECTRONIC DOCUMENT THAT IS ASSOCIATED WITH A KEYWORD INCLUDED IN THE INPUT
1002

GENERATE A SET OF TOKENS FROM THE ELECTRONIC DOCUMENT, EACH TOKEN CORRESPONDING TO ONE OR MORE STRINGS WITHIN THE ELECTRONIC DOCUMENT
1004

SEND THE KEYWORD AND THE SET OF TOKENS TO A MACHINE LEARNING SYSTEM, WHEREIN THE MACHINE LEARNING SYSTEM GENERATES A REPRESENTATION OF THE KEYWORD AND A REPRESENTATION OF EACH TOKEN WITHIN THE SET OF TOKENS, A REPRESENTATION OF A STRING BEING GENERATED BASED ON CONTEXTUAL USAGE OF THE STRING IN RELATION TO OTHER STRINGS IN TRAINING DATA
1006

RECEIVE, FROM THE MACHINE LEARNING SYSTEM, AT LEAST ONE STRING WITHIN THE ELECTRONIC DOCUMENT THAT IS ASSOCIATED WITH THE KEYWORD, THE AT LEAST ONE STRING BEING ASSOCIATED WITH THE KEYWORD BASED ON THE REPRESENTATION OF THE KEYWORD HAVING AT LEAST A THRESHOLD SIMILARITY TO A REPRESENTATION OF A TOKEN CORRESPONDING TO THE AT LEAST ONE STRING
1008

OUTPUT AN INDICATION OF THE AT LEAST ONE STRING THAT IS ASSOCIATED WITH THE KEYWORD
1010

FIG. 10

MODEL-BASED SEMANTIC TEXT SEARCHING

FIELD

This application is generally related to performing model-based semantic text searches using a model generated by a machine learning system. For example, aspects of this application relate to receiving input corresponding to a keyword and determining, using a model of representations of a set of words, words within the electronic document that are semantically related to the keyword.

BACKGROUND

Numerous applications, including word processing applications, web applications, mobile applications, among others, enable users to perform searches for text within documents and/or user interfaces. For example, when viewing an electronic document displayed by an application, a user may be able to open or activate a word search user interface (e.g., by pressing "Ctrl+F" on a keyboard). The word search user interface may allow the user to enter a keyword containing one or more characters, words, phrases, etc. A text-searching system implemented by the application can then identify and return portions of text within the document that match or correspond to the keyword. In this way, the user can navigate to portions of the document relevant to content of the keyword.

Many existing solutions for searching for a keyword utilize or rely on string matching. A string matching solution may return portions of a document that directly match or include a string of text entered by a user. For example, if the user searches for the string "turn," a string matching solution may return each instance of "turn" within a document, including words that contain the string "turn" in addition to other characters, such as "turns" and "turning." While a string matching approach may return relevant results in some cases, the overall usefulness of such an approach may be limited. For example, a string matching solution may not return any results (or may return inaccurate results) if a user spells a search query incorrectly, even by a single letter. Similarly, a string matching solution may fail to return helpful results if a user enters a different version of a word included in a document (such as "color" versus "colour" or "lives" versus "life").

Some text-searching solutions may attempt to expand or broaden the results returned by a string matching approach. For instance, a text-searching solution may implement stemming, which involves truncating a search query (e.g., changing "studies" to "studi"). In another case, a text-searching solution may implement lemmatization, which involves identifying the base or lemma of a search (e.g., changing "studies" to "study"). Further, some text-searching solutions may utilize dictionaries or thesauruses to search for words similar to a text query. However, these text-searching solutions may still fail to return many results that are relevant to a keyword. Specifically, existing text-searching solutions do not consider the semantic meaning or context of a keyword.

Semantic text search based systems and techniques are needed for returning words within documents that are semantically related to an entered keyword.

SUMMARY

Techniques are described herein for performing model-based semantic text searches. A semantic text-searching solution uses a machine learning system (such as a deep learning system) to determine associations between the semantic meanings of words. These associations are not limited by the spelling, syntax, grammar, or even definition of words. Instead, the associations can be based on the context in which strings (e.g., characters, words, phrases, etc.) are used in relation to one another. For example, the semantic text-searching solution may associate the word "vehicle" with not only "vehicles" (as may be done by a string matching solution), but also with words such as "truck," "transportation," "DMV," and "airplane." As another example, the semantic text-searching solution may associate the word "red" with "burgundy" (because burgundy is a variation of red), as well as "yellow" and "green" (because red, yellow, and green are commonly used together in connection with standard traffic lights). In response to detecting a request to determine words within an electronic document that are associated with a keyword, the semantic text-searching solution can return words within the document that have matching and/or related semantic meanings or contexts, in addition to exact matches (e.g., string matches) within the document. Further, the semantic text-searching solution can display indications of the matching words within the document.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 5 is an illustration of an example document and tokens of the document, in accordance with some examples provided herein;

FIG. 10 is a flowchart illustrating an example of a process of performing a semantic text search, in accordance with some examples provided herein;

DETAILED DESCRIPTION

Figure 1:
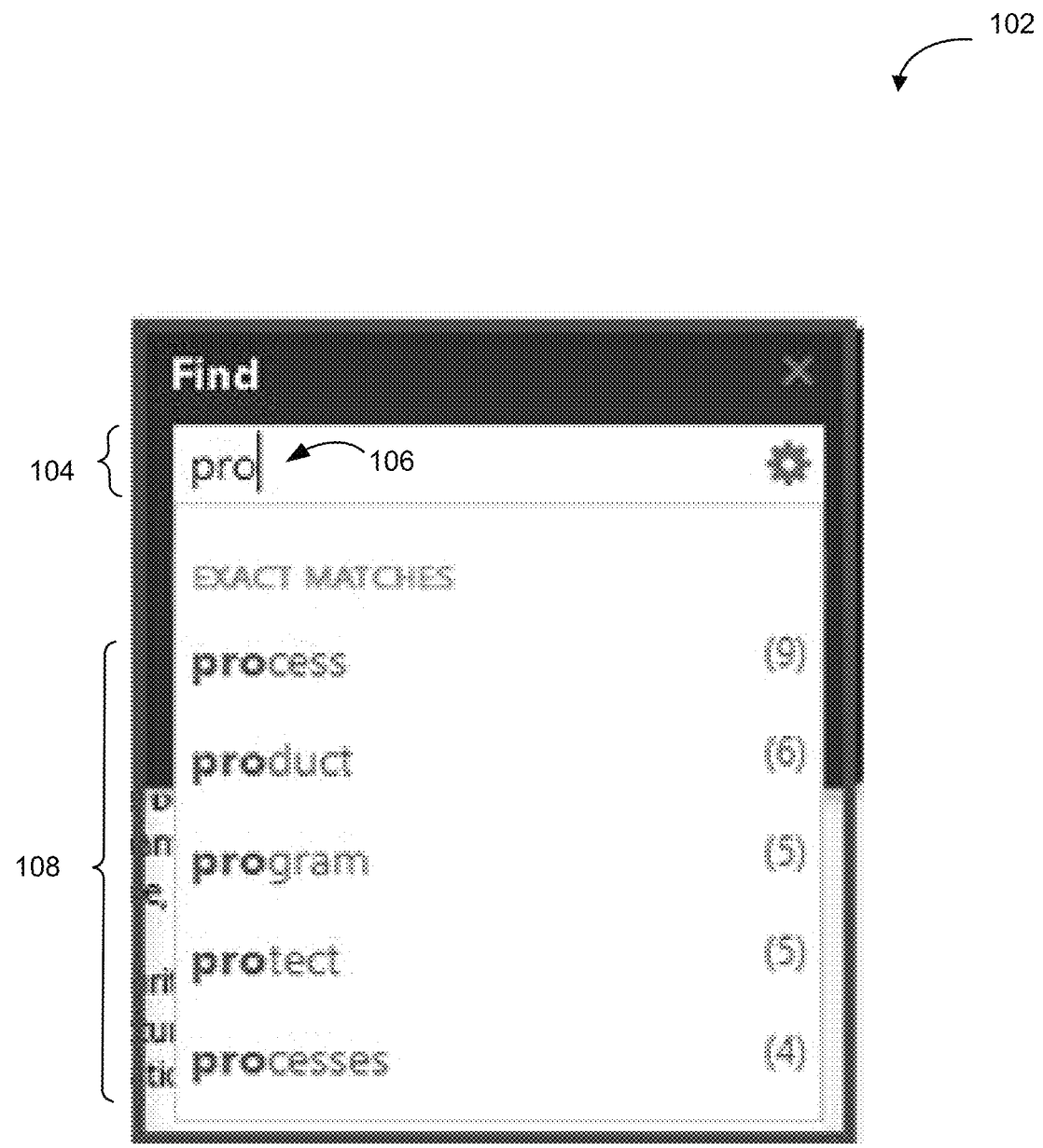
FIG. 1 is an illustration of an example word search user interface provided by a string-based text search system, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Numerous applications, including word processing applications, web applications, mobile applications, among others, enable users to perform searches for strings or text (e.g., characters, words, phrases, etc.) within user interfaces. For example, when viewing an electronic document displayed by an application, a user may be able to open or activate a word search user interface (e.g., by pressing "Ctrl+F" on a keyboard). The word search user interface may allow the user to enter a keyword containing one or more characters, words, phrases, etc. A text-searching system implemented by the application can then identify and return portions of text within the document that match or correspond to the keyword. In this way, the user can navigate to portions of the document relevant to content of the keyword.

Many existing solutions for searching for a keyword utilize or rely on string matching. A string matching solution may return portions of a document that directly match or include a string entered by a user. For example, if the user searches for the string "turn," a string matching solution may return each instance of "turn" within a document, including words that contain the string "turn" in addition to other characters, such as "turns" and "turning." While a string matching approach may return relevant results in some cases, the overall usefulness of such an approach may be limited. For example, a string matching solution may not return any results (or may return inaccurate results) if a user spells a search query incorrectly, even by a single letter. Similarly, a string matching solution may fail to return helpful results if a user enters a different version of a word included in a document (such as "color" versus "colour" or "lives" versus "life").

Some text-searching solutions may attempt to expand or broaden the results returned by a string matching approach. For instance, a text-searching solution may implement stemming, which involves truncating a search query (e.g., changing "studies" to "studi"). In another case, a text-searching solution may implement lemmatization, which involves identifying the base or lemma of a search query (e.g., changing "studies" to "study"). Further, some text-searching solutions may utilize dictionaries or thesauruses to search for words similar to a keyword. However, these text-searching solutions may still fail to return many results that are relevant to the keyword. For example, existing text-searching solutions do not consider the semantic meaning or context of the keyword.

Systems and related techniques are provided herein which provide benefits and solve one or more of the problems noted above by performing text searches that return text or strings (e.g., words, characters, phrases, etc.) that are semantically related to entered keywords. These systems and techniques can be generally divided into two components. The first component relates to generating (e.g., training) a model that represents semantic relationships between words. The second component relates to using the model to identify, within a document, text relevant to a user's query.

As used herein, a "semantic relationship" between two or more words (or other stings) refers to how the words are used contextually in relation to each other. For instance, two words that are semantically related to each other may be used together (e.g., within the same sentence, paragraph, document, conversation, etc.) more frequently than two words that have no semantic relationship (or are less semantically related). In another example, two semantically related words may have similar meanings or definitions. As an illustrative example, the words "hill" and "mountain" may be semantically related because the two words have similar meanings. However, a semantic relationship is not limited or necessarily defined by a word's definition (e.g., dictionary-based definition). For instance, the words "hill" and "valley," which have generally opposite definitions, may be semantically related due to both words describing geological features. In another illustrative example, the words "spy," "espionage," and "Roscoe H. Hillenkoetter" (the first director of the Central Intelligence Agency) may be semantically related.

Referring to the first component of the disclosed semantic text-searching techniques, a machine learning system can be used to generate the model for representing semantic associations between words. The machine learning system can include a deep learning network and/or algorithm (e.g., including one or more neural networks), and/or any additional machine learning components or architectures. In one example, the model may include or be based on an open-source library, such as fastText. For instance, the semantic text-searching technique may utilize the framework of fastText or a similar library to build a model that learns associations between words within a database (such as Wikipedia articles written in a particular language). In other examples, the machine learning system may generate and/or train the model from scratch without the use of a pre-configured library.

In some cases, the semantic text-searching technique may build the model based on text or string representations. An example of word representations are word embeddings (or character and/or phrase embeddings). A word embedding may include or correspond to a vector representation of a word within a predefined vector space. The vector space may have any number of dimensions (such as 100 dimensions, 300 dimensions, or 500 dimensions). Within the vector space, words (or characters or phrases) with similar semantic meanings or contexts may have similar or nearby vectors. For instance, the numerical distance between the vector representations of two words with similar semantic meanings may be less than the numerical distance between vector representations of two words with dissimilar or unrelated semantic meanings. As an example, the vector representation of the word "red" may be located within a subspace of the vector space that includes other colors, such as "green" and "purple." Within the subspace, the vector representation of "red" may be closer to the vector representation of "green" than the vector representation of "purple," because red and green may have the additional association of being commonly referred to together in connection with traffic lights. Such vector representations may be created or updated as word associations are discovered or refined.

In some cases, the vector representations and/or other types of representations of words can be stored by a server that is in communication with one or more end-user devices (e.g., client devices). In some cases, each of the one or more end-user devices can implement the semantic text-searching system as an application or other machine-executable program. For instance, an application on an end-user device may be configured with an interface that enables a user to input a keyword as a request to determine corresponding portions of text within a document. Referring to the second component of the disclosed semantic text-searching techniques, the application may prompt the server to return a list of words within the document that are semantically related (e.g., by at least a threshold degree) with the keyword. In some cases, the server determines words that are semantically related to a keyword by comparing the vector representation of the keyword with vector representations of unique tokens (e.g., words, phrases, or characters) within the document. In one example, the application can send the document to the server and the server can identify the tokens within the document. In other examples, the application can identify the tokens and send the tokens to the server along with the keyword. In some cases, the application can begin compiling a list of unique tokens within the document in response to the user opening the document, or in response to the user initiating a search (e.g., opening a word search user interface). In some cases, the application can identify tokens within a portion (e.g., one or two pages) of the document at a time, instead of processing the entire document in one call or action.

In addition, the application can dedupe the list of tokens (e.g., remove duplicate tokens) before sending the tokens to the server. In some implementations, the application can locally use the tokens and the keyword to determine words that are semantically related to the keyword.

The application may send the list of tokens from a document and/or the keyword to the server in response to various contexts and/or input. In one case, the application can send the list of tokens and the keyword after determining that the user has entered at least a certain number (e.g., 2, 3, etc.) of characters into the word search user interface. Additionally or alternatively, the application can send the list of tokens and the keyword after determining that the user has not entered a new character into the word search user interface for a threshold period of time (e.g., 100 milliseconds, 200 milliseconds, etc.). Such strategies may reduce the processing power and/or bandwidth consumed while making numerous (e.g., unnecessary) calls to the server. If the application detects that the user has entered a new character after the threshold period of time, the application can send the updated keyword to the server. The application can also re-send the list of tokens in implementations where the server does not save the tokens (e.g., to ensure privacy of the document).

Once the server receives the token list and the keyword, the server can determine vector representations of the token list and the keyword. The server can then determine the similarity between the keyword and the token list using one or more types of similarity metrics. For instance, the server can utilize a similarity function (such as a cosine similarity function) to determine a similarity score between the keyword and each token. Based on the similarity scores, the server can determine which tokens are semantically related to the keyword. For example, the server can identify tokens whose similarity scores are at least a threshold score (e.g., a score of 0.4 on a scale of 0 to 1). In some cases, the server can identify a number (e.g., 4, 5, etc.) of tokens with the highest similarity scores from the tokens that are equal to or greater than the threshold score. The server can return the similar tokens to the application, such as all tokens that are equal to or greater than the threshold score or the number of tokens with the highest similarity scores. After receiving the similar tokens from the server, the application can indicate these tokens to the user (e.g., by displaying the words, phrases, etc. associated with the tokens). For example, the application can populate the word search user interface with the token and/or highlight the tokens within the document. In some cases, the word search user interface can also display string matches that include the text of the keyword.

FIG. 1 illustrates a word search user interface 102 that represents an example of a string-based text-searching solution. The word search user interface 102 may be displayed within a user interface that displays an electronic document, displayed on top of the electronic document within an additional user interface and/or integrated into the electronic document. In an illustrative example, the string-based text-searching solution may activate or otherwise display the word search user interface 102 within an electronic document in response to detecting input corresponding to a search request, such as a user pressing "Ctrl+F" on a keyboard or clicking on a search request button within a toolbar.

As shown in FIG. 1, the word search user interface 102 includes a search bar 104 into which a user can provide input corresponding to a text query or a search query (referred to herein as a keyword). A keyword may include one or more characters, words, and/or phrases. A user may provide input corresponding to a keyword using a variety of input mechanisms, such as providing the keyword via voice commands and/or entering the keyword using a physical or digitally rendered keyboard. In the example of FIG. 1, the search bar 104 displays an entered keyword 106 corresponding to the text "pro." In response to detecting this input, the string-based text search solution may search the electronic document to identify each portion of text that include the string "pro." The string-based text search solution may then return indications of these words to the user. In the example of FIG. 1, the string-based text-searching solution may populate the word search user interface 102 with matches 108 corresponding to words that include the keyword 106. Because matches 108 include the exact string of the keyword 106, matches 108 may be referred to as "exact matches." While matches 108 may be relevant to a user's search in some cases, matches 108 may fail to include one or more additional words that may be relevant or otherwise helpful to a user due to the additional words having a semantic relationship with the keyword 106.

Figure 2:
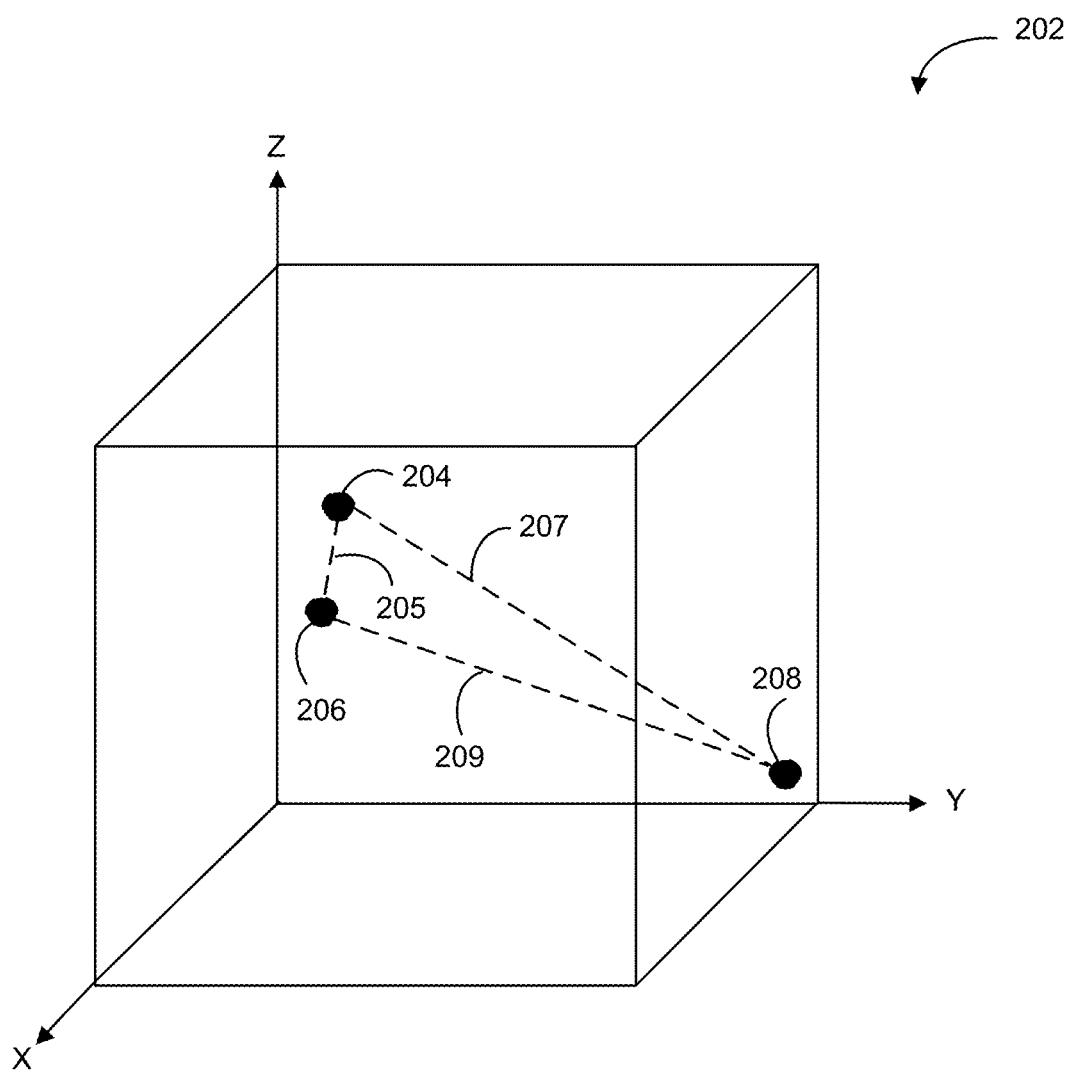
FIG. 2 is an illustration of an example vector space, in accordance with some examples provided herein.

The disclosed semantic text-searching solutions can determine semantic relationships between words in a variety of ways. In some cases, a semantic text-searching system may determine semantic relationships using a word embedding model, which can include one or more techniques for latent semantic analysis, language modeling, and/or natural language processing. In one example, a word embedding model may involve representing the semantic meaning of words with vector representations determined within a multi-dimensional vector space. A vector representation may indicate the relative similarity between semantic features of the word and semantic features of other words, and may therefore be called a feature vector. FIG. 2 illustrates an example vector space 202 that includes multiple feature vectors. In this example, the vector space 202 is three-dimensional. However, the vector spaces used by the disclosed semantic text-searching systems may have any suitable number of dimensions, such as 50 dimensions, 100 dimensions, or 200 dimensions. As illustrated in FIG. 2, the vector space 202 includes a vector 204, a vector 206, and a vector 208. These vectors may each correspond to a distinct word. In other examples, the vectors may correspond to any additional unit or element of language, such as one or more characters, words, and/or phrases (collectively referred to as strings or text). For instance, the vectors may correspond to n-grams (phrases including n words) of any length. Further, the vector space 202 may include representations of any number of words or n-grams, such as thousands, millions, or even billions of words.

The distances between the vectors 204, 206, and 208 correspond to the strength of the semantic relationships between the vectors. For instance, the words represented by the vectors 204 and 206 may have a stronger semantic relationship with each other than to the word represented by the vector 208. Thus, a distance 205 between the vector 206 and the vector 204 is shorter than a distance 207 between the vector 204 and the vector 208. Similarly, the distance 205 is shorter than a distance 209 between the vector 206 and the vector 208. In an illustrative example, the vector space 202 may correspond to a subspace of a larger vector space, the subspace including vector representations of various animals. In this example, the vector 204 may represent the word "cow," the vector 206 may represent the word "sheep," and the vector 208 may represent the word "parrot." The distance 205 may be smaller than the distances 207 and 209 because the words "cow" and "sheep" may be used more frequently together (for example, when discussing farms or farm animals) than together with the word "parrot."

In some cases, the disclosed semantic text-searching solutions can generate and/or refine feature vectors of words using artificial intelligence (AI), such as a machine learning system or algorithm. Machine learning is a sub-area of AI in which a machine learning model is trained to perform one or more specific tasks. For instance, a machine learning model is trained to perform a target task by relying on patterns and inference learned from training data, without requiring explicit instructions to perform the task. Machine learning models have become customary in many devices and systems for performing various tasks, including categorizing data, translating text, detecting and preventing cyber-attacks, recommending products, among others. In a semantic text-searching system, a word embedding model can be trained to determine vector representations of semantically related words as closer together within the vector space than feature vectors of semantically unrelated words. Words will be used herein as an illustrative example of text or strings. However, one of ordinary skill will appreciate that other text strings (e.g., foreign language characters or other characters, and/or other types of text) can be analyzed and processed by an embedding model using the techniques described herein. In some cases, the model can determine vector representations of a set of words, evaluate the quality of the vector representations (e.g., determine how accurately the vector representations portray semantic relationships), and then update one or more parameters of the model to improve the quality of the vector representations. This training process may be performed iteratively for any number of cycles, such as hundreds or thousands of cycles, or for a sufficient number of cycles for the model to converge and/or be otherwise considered fully trained.

The word embedding model can be trained using a variety of types of machine learning algorithms and techniques. In one embodiment, the model can be trained using a deep learning algorithm, such as an algorithm including one or more neural networks. The term "neural network," as used herein, can refer to a set of algorithms or steps designed to recognize patterns or relationships within a data set. Neural networks may include an input layer, an output layer, and one or more hidden layers. The hidden layers can process data provided to the input layer, and the output layer can output the result of the processing performed by the hidden layers. In some cases, the hidden layers can include one or more interconnected nodes. Each node can represent a piece of information. Information associated with the nodes is shared among the different layers and each layer retains information as information is processed.

In some cases, each node or interconnection between nodes can have one or more tunable weights. Weights are a set of parameters derived from the training of the neural network. For example, an interconnection between nodes can represent a piece of information learned about the interconnected nodes. The interconnection can have a tunable weight that can be tuned during training (e.g., based on a training dataset including multiple training documents), allowing the neural network to be adaptive to inputs and able to learn as more and more data is processed. Each weight can include a numeric value.

In some cases, a neural network can adjust the weights of the nodes using backpropagation. For example, the neural network can adjust the weights of the nodes by processing a training document and then analyzing the difference between the actual output of the neural network and the desired output of the neural network (e.g., using one or more loss functions). When a neural network is being trained to generate representations (e.g., semantic representations) of strings or text (e.g., a representation of a word or multiple words), the desired output may correspond to feature vectors that accurately portray semantic relationships between the text (e.g., feature vectors that portray semantic relationships between words). The weights of a neural network may be initially randomized before the neural network is trained. For a first training iteration for the neural network, the output will likely include values (e.g., feature vectors) that do not produce accurate and/or desired outputs. The process of processing training documents and updating parameters of the neural network can be repeated for a certain number of iterations for each set of training documents until the neural network is trained well enough so that the weights (and/or other parameters) of the layers are accurately tuned.

In some cases, the neural networks may be trained using an unsupervised training process. In an unsupervised training process, it may not be necessary to label or categorize words within training documents. In some examples, the neural networks may be trained using supervised or semisupervised training processes. Examples of neural networks that may be utilized by a semantic text-searching system include convolutional neural networks, recurrent neural networks, recursive neural networks, self-organizing maps, Boltzmann machines, autoencoders, among others.

Figure 3:
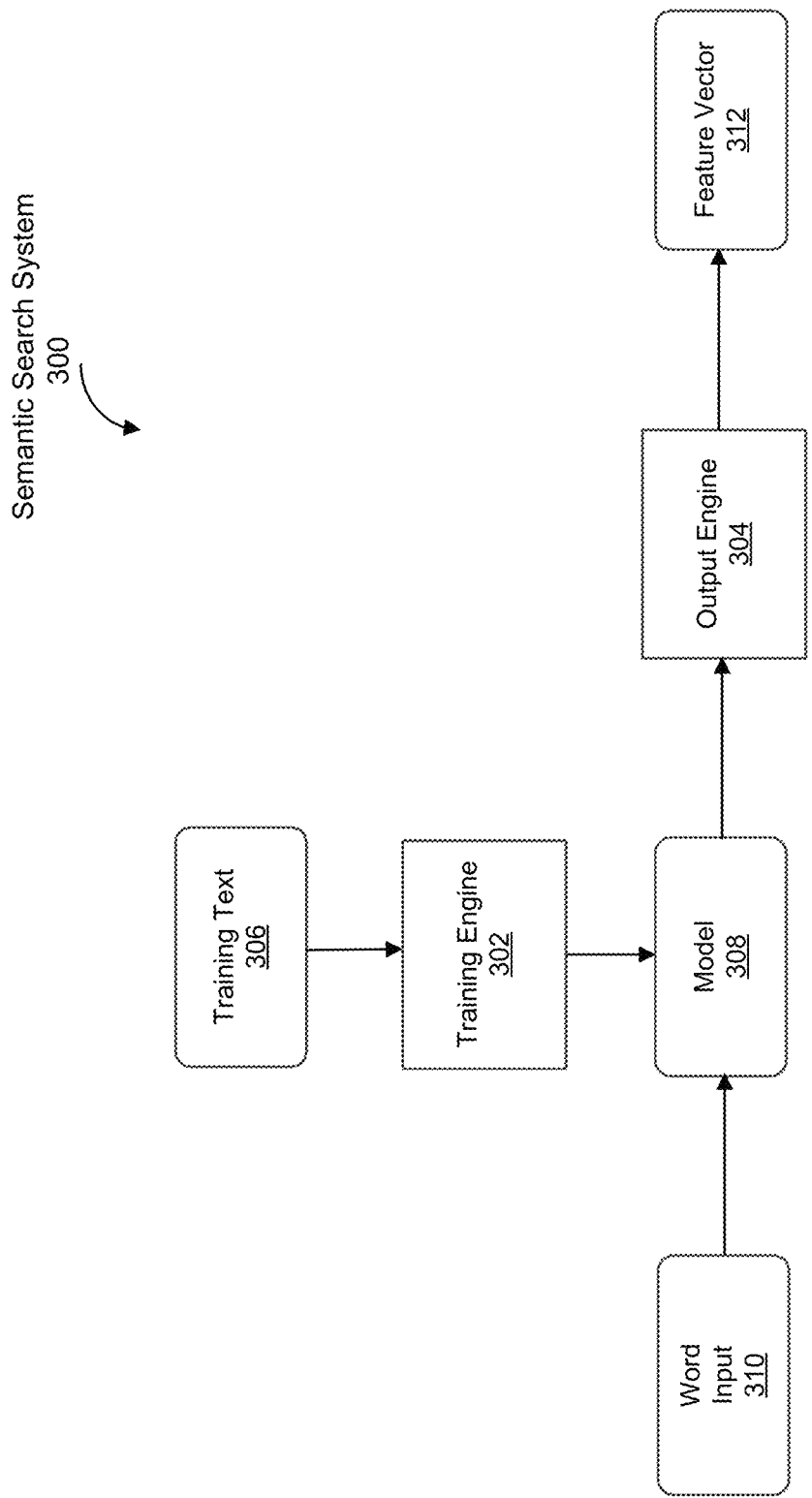
FIG. 3 is a block diagram of an example semantic search system, in accordance with some examples provided herein.

After the word embedding model is trained, the model can be used to determine representations of words input to the model. Using the model to process new input data may be referred to as inference or roll-out. During inference, the model can receive a word or other n-gram and then output a feature vector corresponding to the semantic meaning of the word. FIG. 3 illustrates an exemplary semantic search system 300 for training and using word embedding models. The semantic search system 300 includes various components, including a training engine 302, an output engine 304, training text 306, a model 308, word input 310, and a feature vector 312. The components of the semantic search system 300 can include software, hardware, or both. For example, in some implementations, the components of the semantic search system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the semantic search system 300.

While the semantic search system 300 is shown to include certain components, one of ordinary skill will appreciate that the semantic search system 300 can include more or fewer components than those shown in FIG. 3. For example, the semantic search system 300 can include, or can be part of a computing device that includes, one or more input devices and one or more output devices (not shown). In some implementations, the semantic search system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

As noted above, the semantic search system 300 can be implemented by and/or included in a computing device. In some cases, multiple computing devices can be used to implement the semantic search system 300. For example, a computing device used to implement the semantic search system 300 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the semantic search system 300 can be integrated with (e.g., integrated into the software, added as one or more plug-ins, included as one or more library functions, or otherwise integrated with) one or more software applications, such as a search engine, a web browser, an application that displays text (e.g., Adobe Experience Manager™, Acrobat Desktop", Acrobat Mobile™, Adobe Premiere", Adobe Creative Cloud™, Adobe Illustrator™, Adobe Acrobat™, Adobe Photoshop™, Adobe After Effects™, among others), or other software application that allows a user (also referred to as an end-user) to view and search for text. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the semantic search system 300 can be implemented in a suite of software applications.

In some cases, the training engine 302 generates and/or trains model 308 using training text 306. Training text 306 includes any set, collection, or corpus of text. Training text 306 may include any number or type of text string, such as words, phrases, characters, and/or or other n-grams. For instance, the training text 306 can include millions or billions of text strings, such as words or other n-grams. Training text 306 may include a sufficient amount of text (e.g., a sufficient number of different words used in various contexts) to train model 308 to generate feature vectors that accurately represent semantic relationships between words. In an illustrative example, training text 306 may include all or a portion of a Wikipedia database corresponding to articles written in the same language. In some examples, the training engine 302 may use multiple databases corresponding to articles written in various languages to generate a set of models capable of determining feature vectors of words in the various languages. Training text 306 may include any additional or alternative type of training text. In some cases, the training engine 302 may generate the model 308 by updating and/or training an existing or previously generated library that includes a set of vector representations (or is configured to output vector representations). In an illustrative example, the library may include an open source library available to the public, such as fastText or a similar library. Building a word embedding model by training an existing library (instead of building a word embedding model from scratch) may reduce the time and/or processing power involved in training the model. However, in some cases, generating the model 308 may include generating the library.

In some examples, the training engine 302 may train model 308 by determining how frequently one string, such as a word or other n-gram, is used together with one or more other strings (e.g., other words or other n-grams) within training text 306. For instance, the training model 308 may determine and/or analyze the rate at which two or more words or other n-grams co-occur within documents or portions of documents (e.g., sentences, paragraphs, etc.). As an illustrative example, the training engine 302 may determine that the word "spy" is semantically related to the word "espionage" based at least in part on determining that "spy" and "espionage" have a high rate (e.g., above a threshold rate) of co-occurrence within a group of documents (e.g., a number of Wikipedia articles). For instance, the training engine 302 may determine that Wikipedia articles that contain the word "spy" are likely to also contain the word "espionage" and, therefore, the two words are semantically related. The training engine 302 may determine semantic relationships between words using any additional or alternative analysis of training text 306.

The training engine 302 may train the model 308 to determine feature vectors of strings or n-grams including any number of words and/or characters. For instance, the training engine 302 may train the model 308 to determine feature vectors corresponding to partial words (e.g., strings of characters that do not make up an entire word). Additionally or alternatively, the training engine 302 may train the model 308 to determine feature vectors corresponding to multiple-word phrases, such as "the Queen of England" or "time of day." In some cases, training the model 308 to determine feature vectors corresponding to multiple-word phrases may include training the model 308 based on averages of feature vectors of individual words within the phrases. Further, the training engine 302 may train the model 308 to determine feature vectors of any type or form of word or n-gram, such as verbs, prepositions, adjectives, nouns, pronouns, proper nouns, names, places, among others. In some cases, the training engine 302 may also train the model 308 to determine feature vectors corresponding to misspelled words. For instance, the training engine 302 may configure the model 308 to detect when a word input to the model 308 is an incorrectly spelled version of a word known to the model (such as "basktball" instead of "basketball"), rather than disregarding the word as an unknown or unsupported word.

After the model 308 is sufficiently trained, the model 308 may receive word input 310. Word input 310 may correspond to any string (e.g., word or other n-gram) provided to the model 308 as part of a request to determine a feature vector indicating semantic relationships between the word input 310 and other strings (e.g., words or other n-grams) used to train the model 308. Based on word input 310, the output engine 304 may output the feature vector 312 that represents the semantic relationships. For instance, the output engine 304 may search the model 308 to identify a feature vector corresponding to the word input 310. This process of outputting the feature vector 312 may be referred to as extracting the word embedding of the word input 310.

Figure 4:
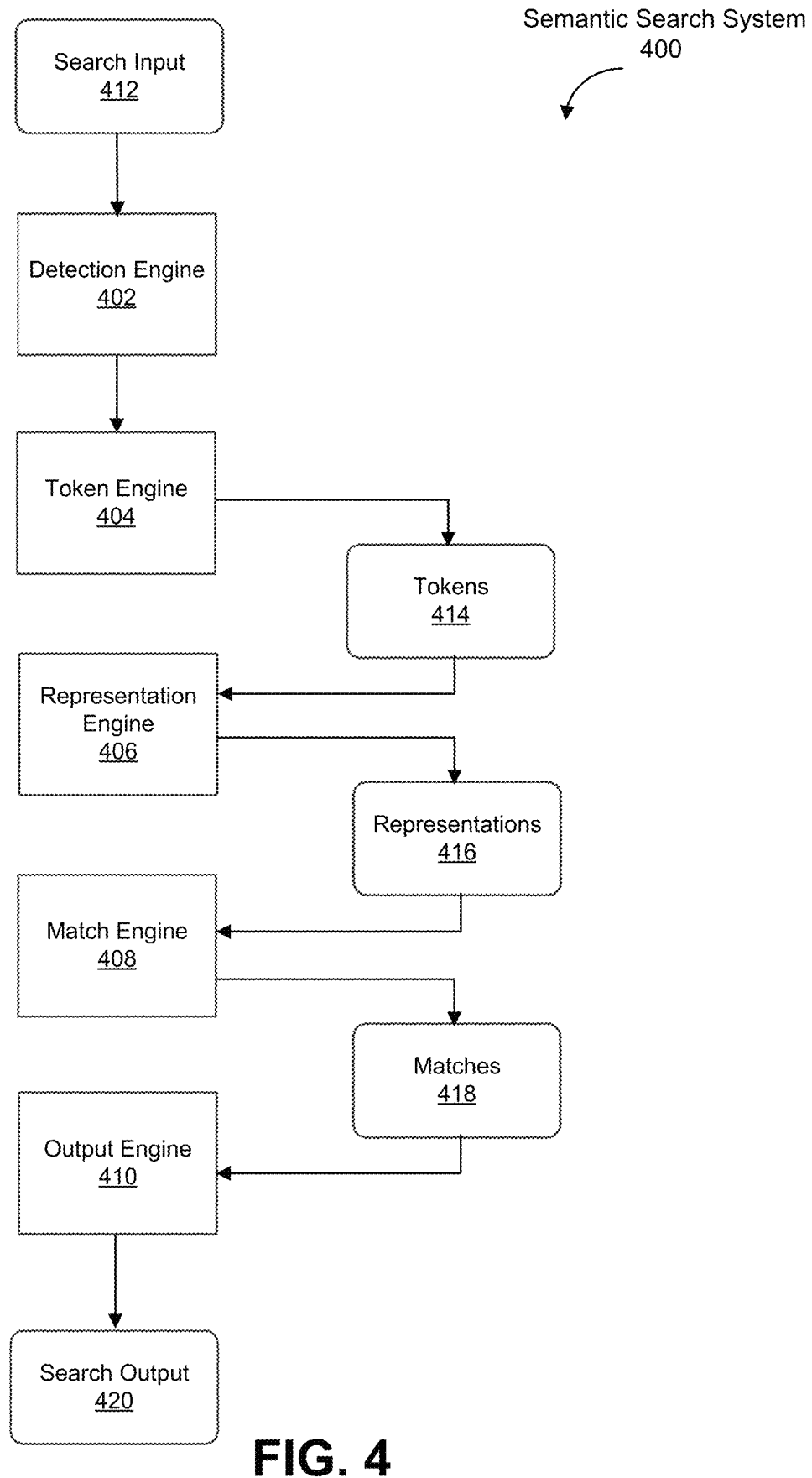
FIG. 4 is a block diagram of an example semantic search system, in accordance with some examples provided herein.

FIG. 4 is a diagram illustrating an example semantic search system 400 for using a word embedding model to perform semantic text searches. The semantic search system 400 includes various components, including a detection engine 402, a token engine 404, a representation engine 406, a match engine 408, an output engine 410, search input 412, tokens 414, representations 416, matches 418, and a search output 420. In some cases, the semantic search system 400 includes, implements, and/or is in communication with all or a portion of the semantic search system 300 illustrated in FIG. 3.

In an illustrative example, at least a portion of the semantic search system 400 may be implemented by a backend server or application server that trains and stores word embedding models (such as the model 308 of FIG. 3). In this example, another portion of the semantic search system 400 may be implemented by an end-user device (such as a personal computer, a tablet computer, or a mobile device) that is in communication with the server and that runs an application configured to perform semantic text searches Examples of such an application include Adobe Experience Manager™, Acrobat Desktop™, Acrobat Mobile™, Adobe Premiere™, Adobe Creative Cloud™, Adobe Illustrator™ Adobe Acrobat™, Adobe Photoshop™, Adobe After Effects™, among others.

The semantic search system 400 may include any combination of software, hardware, or firmware. For example, in some implementations, the components of the semantic search system 400 can include and/or can be implemented using electronic circuits or other electronic hardware, which can include one or more programmable electronic circuits, processing devices, and/or can include and/or be implemented using computer software, firmware, or any combination thereof, to perform the various operations described herein. The software and/or firmware can include one or more instructions stored on a computer-readable storage medium and executable by one or more processors of the computing device implementing the semantic search system 400. The semantic search system 400 can include any additional or alternative component not shown in FIG. 4.

The search input 412 may include any input corresponding to a request to determine or locate text within an electronic document that is associated with a keyword. In some cases, the search input 412 may include initiation or activation of a search request. For instance, the search input 412 may include a user opening a word search user interface (similar to the word search user interface 102 illustrated in FIG. 1). As discussed in connection with FIG. 1, the user may open a word search user interface by entering a command such as "Ctrl+F," clicking a button to open the word search user interface, or in any additional manner Additionally or alternatively, the search input 412 may include one or more characters of a keyword, including a portion of a keyword or multiple keywords. For instance, the search input 412 may include text entered into a search bar of a word search user interface. In one embodiment, the search input 412 may include the word input 310 illustrated in FIG. 3. Detection engine 402 may detect the search input 412 in a variety of ways. In some examples, the detection engine 402 may detect the search input 412 by periodically or continuously monitoring a user interface displaying an electronic document. For instance, the detection engine 402 may monitor the user interface to detect activation of a word search user interface, and then monitor the word search user interface to detect characters entered into the word search user interface.

After the detection engine 402 detects all or a portion of the search input 412, the token engine 404 may generate a set of tokens 414 of the electronic document. As used herein, the word "token" refers to a string of one or more characters and/or words included within an electronic document. For instance, a token may include a prefix, suffix, set of characters, word, and/or phrase. In some cases, a token may include an n-gram with a definable semantic meaning. For instance, a token may include a group of words used in a specific order to portray a specific meaning, rather than a random or arbitrary group of words. Some tokens may include one or more punctuation marks (such as a hyphen).

The token engine 404 may generate tokens 414 in various ways and/or contexts. In some cases, the token engine 404 may generate tokens 414 by scanning a document to identify each unique (e.g., distinct) token within the document. For instance, as the token engine 404 identifies a token within the document, the token engine 404 may record and/or store the token within a list. If the document includes more than one instance of a token, the token engine 404 may remove repeated instances of the token from the list. The process of removing repeated tokens may be referred to as deduplication or deduping. Further, in some cases, the token engine 404 may generate a set of tokens by analyzing a portion of a document at a time. For instance, the token engine 404 may perform separate function calls to identify tokens within individual pages (or a small number of pages) of a document, instead of executing a single function call to identify each token within the entire document. This process may prevent an application that implements the semantic search system 400 from crashing, becoming unresponsive, or otherwise malfunctioning (especially when handling large documents, such as documents within hundreds of pages).

In some cases, the token engine 404 may generate the tokens 414 in response to the search input 412. For instance, the token engine 404 may generate the tokens 414 after the user has provided input to open the word search user interface, or after the user has provided input corresponding to one or more characters of a keyword. The token engine 404 may generate the tokens 414 at any additional point in time or in response to additional input, such as input corresponding to the user opening the electronic document. For instance, to avoid delaying a semantic text search due to time required to generate the tokens 414 (which may take several hundred milliseconds, for example), the token engine 404 may generate the tokens 414 immediately following the user opening, viewing, or otherwise accessing the electronic document.

FIG. 5 illustrates an exemplary document 502 and exemplary tokens 504 of the document 502 that may be generated by the semantic search system 400. In this example, the tokens 504 include each 1-gram (e.g., single word) and 2-gram (e.g., 2-word phrase) of the document 502.

Returning to FIG. 4, after the tokens 414 are generated, the representation engine 406 may determine representations 416 of the tokens 414 and the keyword corresponding to the search input 412. For instance, the token engine 404 may send the keyword and the tokens 414 to the representation engine 406 with a request to determine representations 416. In some embodiments, the representation engine 406 may determine the representations 416 by determining, based on a word embeddings model, feature vectors corresponding to the keyword and each of the tokens 414. If the keyword and/or any of the tokens 414 include multiple-word phrases, the representation engine 406 may determine feature vectors for the phrases by averaging feature vectors of individual words within the phrases.

The match engine 408 can determine matches 418 based on the representations 416. In some examples, the matches 418 may include representations within the representation 416 that have at least a predetermined degree of similarity to the representation of the keyword. The match engine 408 can determine the similarity between representations in various ways. In some cases, the match engine 408 may determine whether two representations are similar by determining a distance between feature vectors corresponding to the representations within a vector space. The match engine 408 can determine this distance using any type or form of distance or similarity measurement, such as a cosine similarity measurement, a Euclidean distance measurement, or other similarity based measurement. In some cases, the match engine 408 may determine the distance between the representation of the keyword and each representation of the tokens 414 using the same similarity or distance measurement. In one embodiment, the match engine 408 can then determine the matches 418 by identifying tokens that have above a threshold similarity to the keyword. As an illustrative example, if the match engine 408 determines similarity measurements as values between 0 and 1 with values closer to 1 indicating high similarity and numbers close to 0 indicating low similarity, the match engine 408 may determine the matches 418 by identifying tokens with a similarity measurement of at least a 0.4, 0.5, etc. Additionally or alternatively, the match engine 408 can determine the matches 418 by identifying a predetermined number of tokens (such as 4 or 5 tokens) or a predetermined percentage of tokens (such as 1% or 5%) most similar to the keyword.

After determining the matches 418, the match engine 408 can send the matches 418 to the output engine 410. The output engine 410 can then display an indication of the matches 418 (corresponding to the search output 420). The match engine 408 can display the search output 420 within a user interface that displays the electronic document or within an additional user interface. For instance, the match engine 408 can display the search output 420 by populating the word search user interface into which the search input 412 was provided with words corresponding to the matches 418. In another example, the match engine 408 can include the words within a user interface displayed on top of or beside the electronic document. In further examples, the match engine 408 can highlight all or a portion of the words within the electronic document. For instance, the match engine 408 can highlight each instance of the matches 418 such that the semantics matches 418 are visible to the user as the user views or scrolls through the electronic document.

Figure 6A:
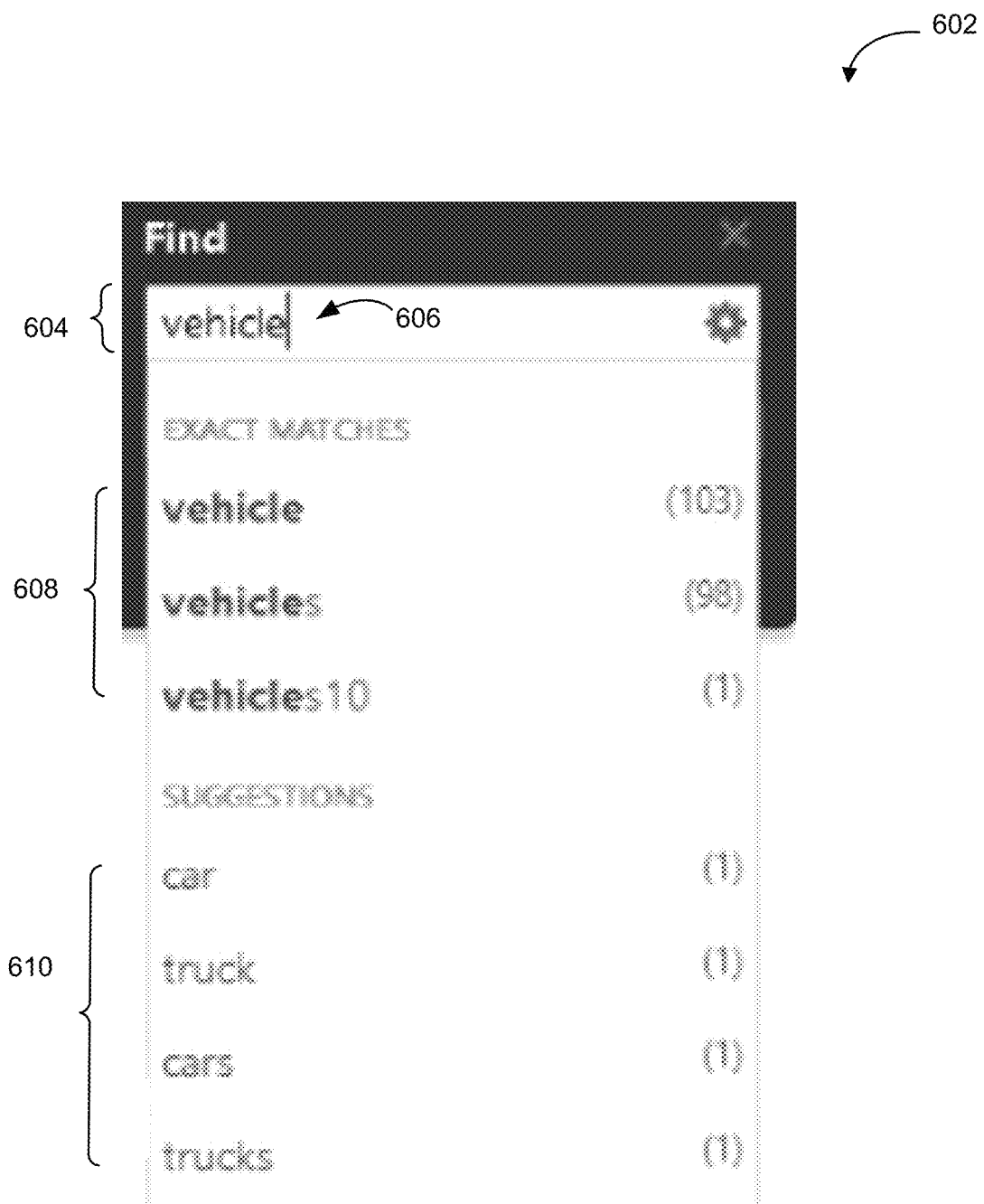
FIG. 6A and FIG. 6B are illustrations of example word search user interfaces provided by a semantic search system, in accordance with some examples provided herein.
Figure 6B:
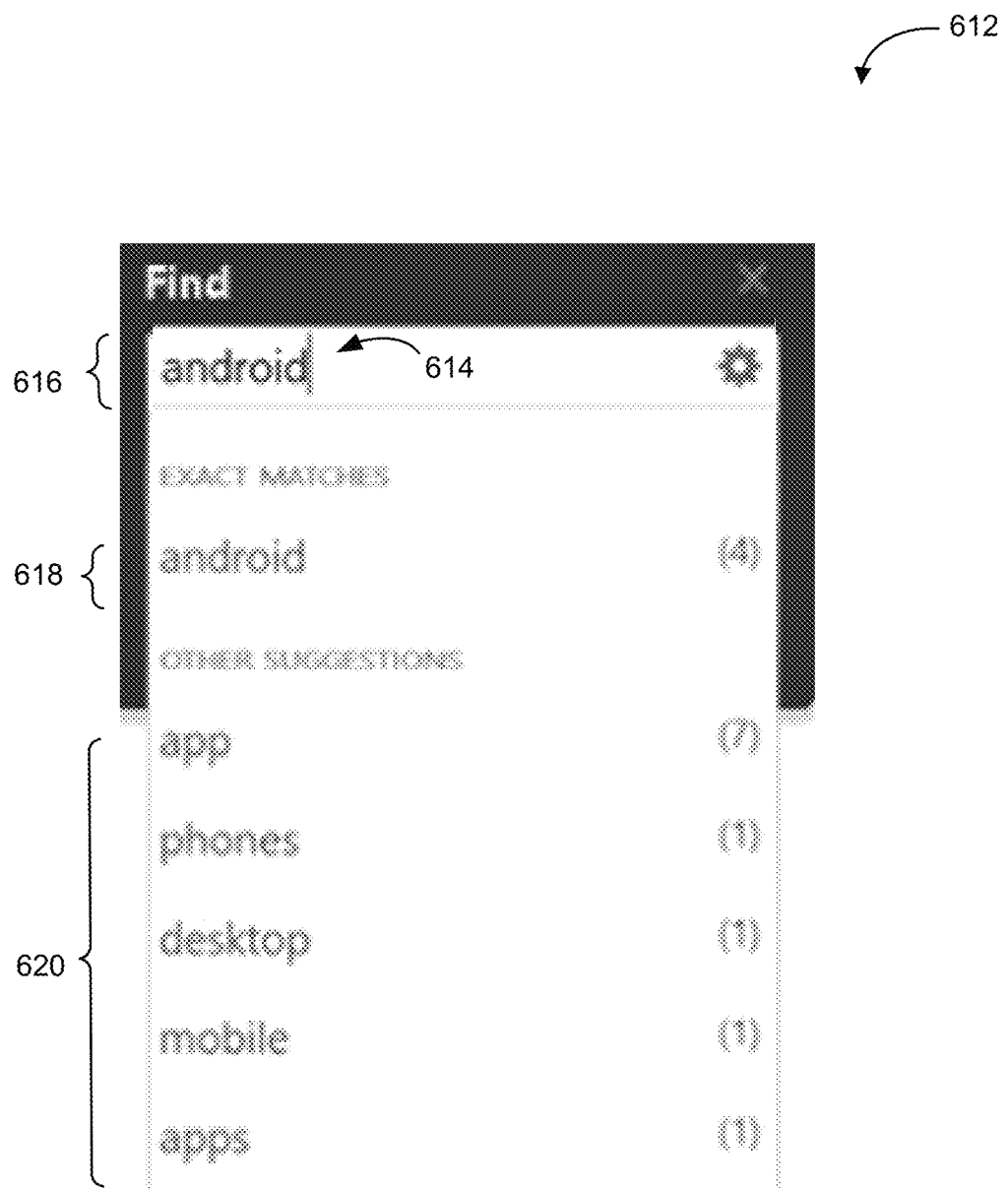

FIG. 6A and FIG. 6B illustrate examples of word search user interfaces that display indications of matches. Specifically, FIG. 6A includes a word search user interface 602 that includes a search bar 604 into which a user has entered a keyword 606 corresponding to the word "vehicle." In this example, the match engine 408 determines matches 610 that correspond to the keyword 606 and the output engine 410 displays indications of the matches 610 within the word search user interface 602. In some cases, the output engine 410 can indicate the number of each of the matches 610 that are included within the electronic document. Additionally or alternatively, the output engine 410 can configure the indications of the matches 610 as links that direct the user to locations of the matches 610 within the electronic document when the user clicks on or otherwise selects the indications. In some examples, the output engine 410 can also include, within the word search user interface 602, string matches 608 corresponding to the keyword 606. String matches 608 may represent words within the electronic document that include the string corresponding to the keyword 606. The string matches 608 can be determined by the semantic search system 400 or another search system implemented by the application displaying the electronic document. Displaying indications of the string matches 608 may increase the potential usefulness of the search results provided to the user. As shown in FIG. 6A, the indications of the string matches 608 may be displayed under an "exact matches" header and the indications of the matches 610 can be displayed under a "suggestions" header. As an additional illustrative example of a word search user interface, FIG. 6B includes a word search user interface 612 that displays a keyword 614 within a search bar 616, as well as string matches 618 and matches 620 corresponding to the keyword 614.

Figure 7:
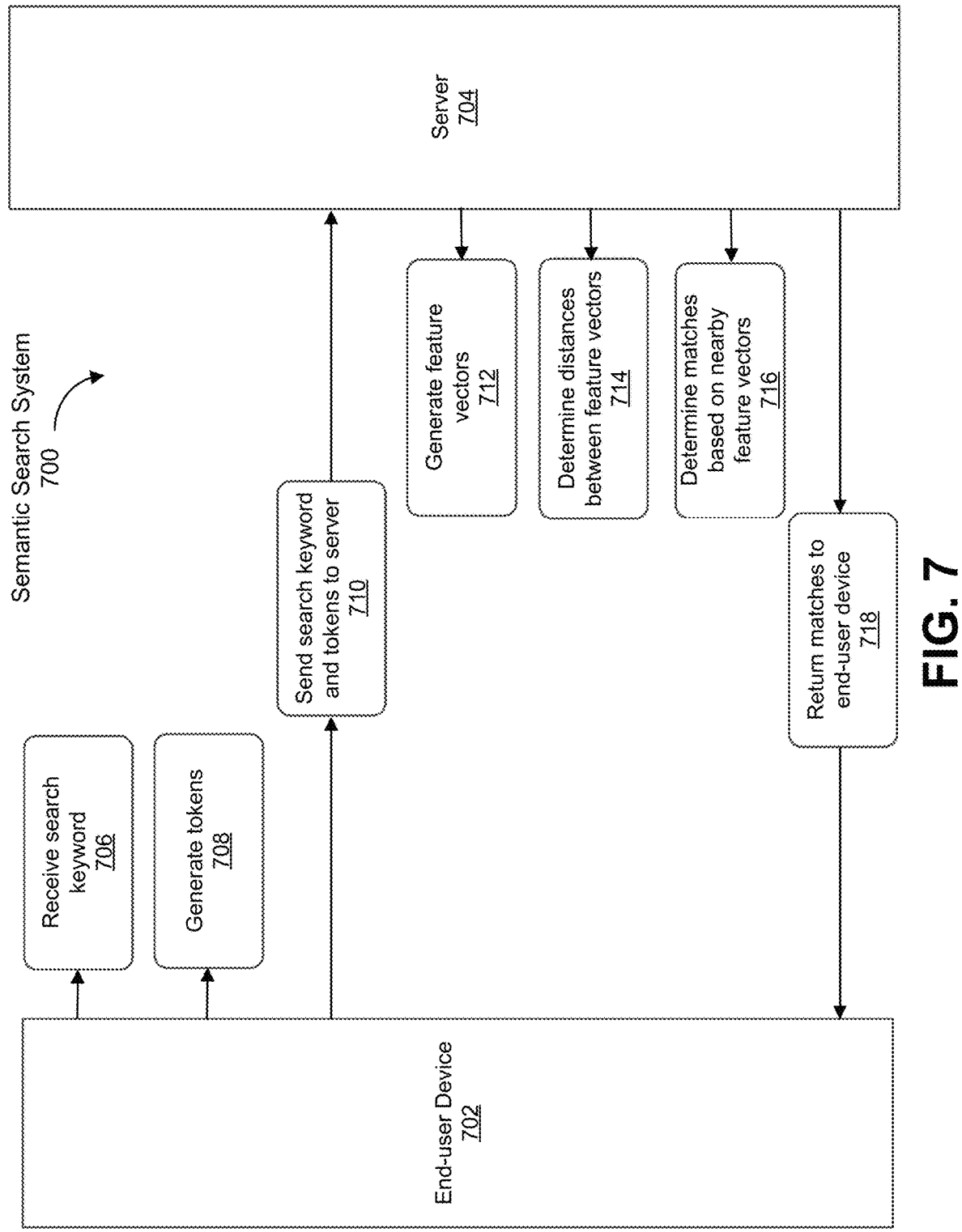
FIG. 7 is a block diagram of an example semantic search system, in accordance with some examples provided herein.

FIG. 7 illustrates an exemplary semantic search system 700 for performing semantic text searches. Specifically, FIG. 7 illustrates exemplary communication between an end-user device 702 and a server 704 while the end-user device 702 and the server 704 perform the disclosed methods for semantic text searches. In one embodiment, the end-user device 702 may include a personal computer, laptop, mobile device, or other type of end-user device that runs an application displaying an electronic document. The application may be configured with one or more engines of the semantic search system 400, such as the detection engine 402, the token engine 404, and the output engine 410. The server 704 may include an application server that is remote or external to the end-user device 702. For example, the end-user device and the server 704 may communicate via a network. In some cases, the server 704 can be configured with one or more engines of the semantic search system 400, such as the representation engine 406 and/or the match engine 408. The server 704 may also be configured with one or more engines of the semantic search system 300, such as the training engine 302 and/or the output engine 304. However, the engines of the semantic search systems 300 and 400 may be implemented in any combination across the end-user device 702 and/or the server 704, including being implemented on a single device.

At step 706 shown in FIG. 7, the end-user device 702 receives a keyword. For instance, the end-user device 702 can detect input corresponding to one or more characters of the keyword. In some cases, the end-user device 702 can determine that receiving the keyword represents a request to determine related text within the electronic document. At step 708, the end-user device 702 generates tokens of the electronic document. Generating the tokens may be performed at any point before or after receiving the keyword. For instance, the end-user device 702 may generate the tokens in response to the electronic document being opened or in response to detecting input corresponding to opening a word search user interface.

At step 710, the end-user device 702 sends the keyword and the tokens to the server 704. At step 712, the server 704 generates feature vectors corresponding to the keyword and the tokens. The server 704 may generate the feature vectors using a word embedding model trained and/or stored by the server 704. At step 714, the server 704 determines distances between the feature vectors. For instance, the server 704 may determine a distance or similarity between a feature vector corresponding to the keyword and each feature vector corresponding to the tokens. At step 716, the server 704 determines matches corresponding to the keyword based on nearby feature vectors. Specifically, the server 704 can identify tokens corresponding to feature vectors that have at least a predetermined degree of similarity to the feature vector representing the keyword. At step 718, the server 704 can return the matches to the end-user device 702 such that the end-user device 702 can display indications of the matches (e.g., within the word search user interface).

The steps illustrated in FIG. 7 as being performed on particular devices are merely examples, and numerous variations are possible. For instance, the end-user device 702 may send the entirety of the electronic document to the server 704 and direct the server 704 to generate the tokens. Additionally or alternatively, the end-user device 702 may generate feature vectors corresponding to the tokens, or perform any additional portion of implementing the word embedding model.

In some cases, it may be difficult to determine when a user has entered a complete keyword. For instance, at a point in time while the user is entering the keyword "maximum," a search system may detect input corresponding to "max." The search system is unaware of the user's intention to extend the keyword. Thus, the search system may perform an initial search based on the keyword "max," and then perform a subsequent search once "maximum" has been entered. Performing such an initial search may facilitate fast search times if the keyword used in the first search corresponds to the user's intended input. However, if multiple searches are required (for example, due to the user typing slowly or entering a long keyword), bandwidth and processing power may be wasted performing the searches.

Accordingly, the disclosed semantic search systems can detect, estimate, and/or predict a time when a user has completed entering a keyword and perform a semantic text search at that time. For instance, referring to the semantic search system 400 of FIG. 4, the detection engine 402 may determine an appropriate time to send a keyword and a list of tokens to a word embeddings model based on monitoring input corresponding to a search. The token engine 404 may send the keyword and the list of tokens to the word embeddings model at the appropriate time.

Figure 8:
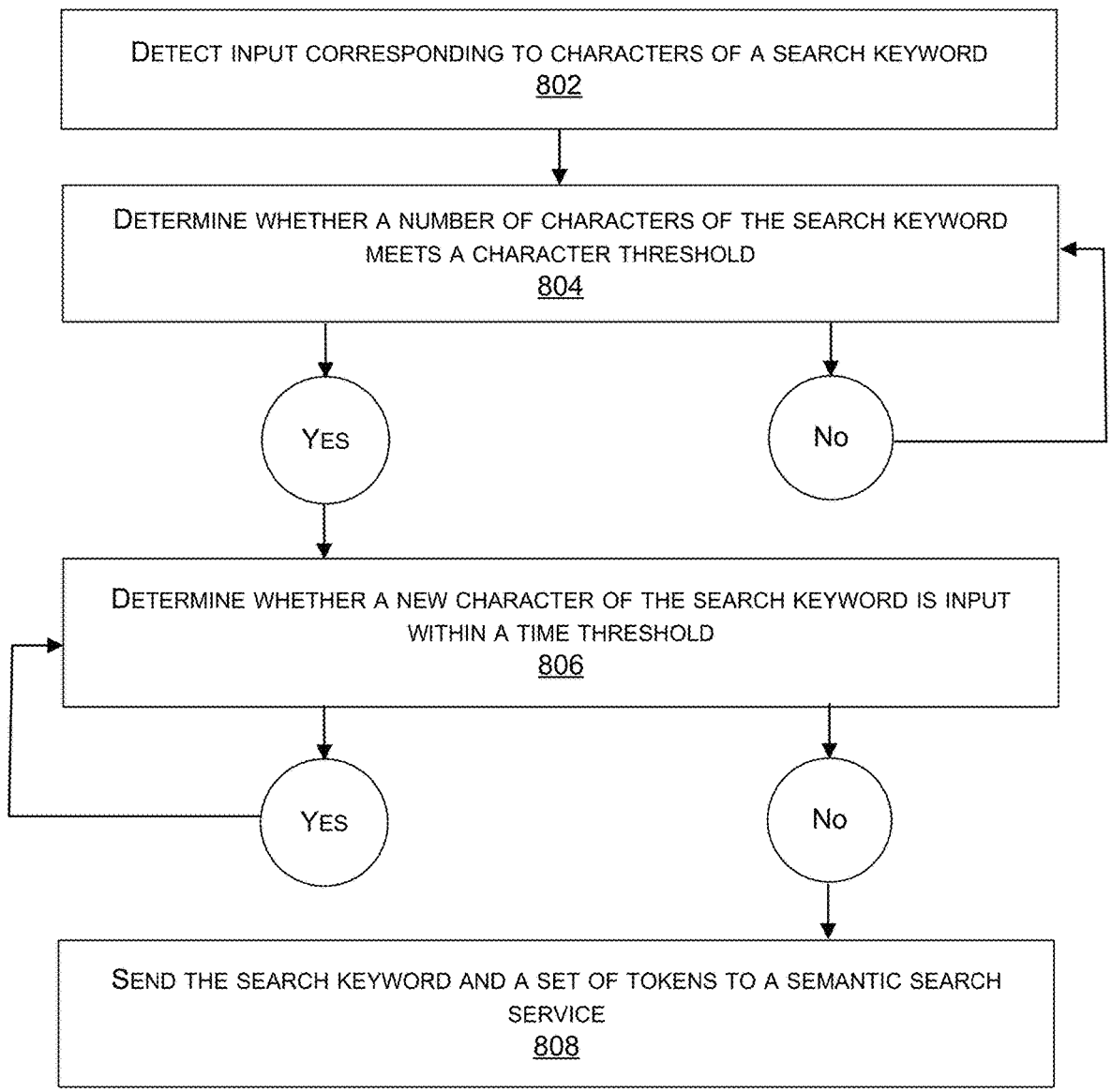
FIG. 8 is a flowchart illustrating an example of a process of performing a semantic text search, in accordance with some examples provided herein.

FIG. 8 illustrates an exemplary process 800 for sending keywords and tokens to a semantic search service that implements a word embedding model. At step 802 of the process 800, the detection engine 402 detects input corresponding to characters of a keyword. For example, the detection engine 402 may detect the initial character entered and each subsequent character. At step 804, the detection engine 402 determines whether a current number of characters of the keyword meets a character threshold (e.g., a character threshold number). The character threshold may be 2, 3, 4, or any suitable number of characters. While a high threshold may result in fewer unnecessary calls to the semantic search service, a threshold that is too high may slow down or impede a search (e.g., if the complete keyword does not meet the threshold). If the detection engine 402 determines that the keyword does not meet the character threshold, the detection engine 402 may continue to monitor input corresponding to characters of the search keyword. If the detection engine 402 determines that the keyword meets the character threshold (or detects input corresponding to the keyword being complete, such as the user pressing "enter"), the process 800 proceeds to step 806.

At step 806, the detection engine 402 determines whether a new character of the keyword is input within a time threshold. In some cases, failing to detect new input within the time threshold may indicate that the user has completed (or is likely to have completed) entering the keyword. The time threshold may be 100 milliseconds, 200 milliseconds, 300 milliseconds, or any suitable amount of time. While a high time threshold may reduce unnecessary calls to the semantic search service, a threshold that is too high may unnecessarily increase search latencies. If the detection engine 402 determines that a new character is input within the time threshold, the detection engine 402 may continue to monitor input corresponding to characters of the keyword. For instance, the detection engine 402 may reset a timer that counts to the time threshold. If the detection engine 402 determines that a new character is not input within the time threshold, the process 800 proceeds to step 808. At step 808, the token engine 404 sends the keyword and a set of tokens to the semantic search service. If the detection engine 402 detects input corresponding to new characters of the keyword after the keyword and the set of tokens are sent to the semantic search service, the token engine 404 can send the updated keyword. The steps illustrated in FIG. 8 are merely examples, and any type or form of threshold or other decision mechanism may be used to determine when a keyword has been completely entered.

As mentioned above, the token engine 404 may begin generating a set of tokens at any point while a user is interacting with an electronic document, such as when the document is opened and/or when the user activates a word search user interface. If the token engine 404 has not completed generating a set of tokens when the detection engine 402 determines that a keyword is complete (e.g., in response to determining "no" at step 806), the token engine 404 can send a partial set of tokens (e.g., the tokens that have been generated so far) to the semantic search service. After additional tokens have been generated (e.g., after the set of tokens is complete), the token engine 404 can send the additional tokens. If the semantic search service does not store the previously sent tokens and/or keyword (e.g., for privacy or security purposes), the token engine 404 can re-send each token and keyword. In some cases, the semantic search service may return initial search results corresponding to the partial set of tokens, and then return subsequent search results in response to receiving subsequent sets of tokens. Output engine 410 may display the initial search results, and then update the displayed search results as more results are returned. While the initial search results may be incomplete, they may still often be relevant or helpful to a user. Thus, "streaming" semantic search results in this manner may facilitate quickly providing the user with high quality semantic search results.

Figure 9:
FIG. 9 is an illustration of an example table that includes latency and payload data associated with performing semantic text searches, in accordance with some examples provided herein.

FIG. 9 illustrates an exemplary table 902 indicating the time and amount of data involved in performing the disclosed semantic text-searching techniques. Specifically, the table 902 indicates the token generation time, token payload, and total search time for semantic searches of documents including various numbers of pages. In some cases, generating a set of tokens on an end-user device instead of a server that implements a word embeddings model may reduce the amount of data (corresponding to the token payload) sent to the server. In addition, generating the tokens on the end-user device may reduce the processing load of the server, which may reduce the total search time.

An example of a process performed using the techniques described herein will now be described. FIG. 10 is a flowchart illustrating an example of a process 1000 for the disclosed semantic text search techniques. At block 1002, the process 1000 includes detecting input corresponding to a request to locate text within an electronic document that is associated with a keyword included in the input. In some cases, the process 1000 may include monitoring input provided to a word search user interface. For instance, the process 1000 can include detecting input prompting an application displaying the electronic document to open a word search user interface. In such an example, the input including the keyword can be received from the word search user interface.

At block 1004, the process 1000 includes generating a set of tokens (e.g., unique tokens) of the electronic document, each token corresponding to one or more strings within the electronic document. The set of tokens may be generated in response to detecting the input corresponding to the request to locate text within the electronic document that is associated with the keyword, or at any other time. In some examples, the set of tokens can be generated by or on an end-user device displaying the electronic document. The set of tokens can be sent or forwarded to a server external to the end-user device that implements the machine learning system. In some examples, the input corresponding to the request to locate text within the electronic document that is associated with the keyword includes a portion of the keyword. Sending (e.g., from the end-user device to the machine learning system), the request to determine the one or more tokens within the electronic document that are associated with the keyword can include sending a request to determine one or more tokens within the electronic document that are associated with the portion of the keyword. Receiving (e.g., at the end-user device from the machine learning system), based on the request, the at least one string within the electronic document that is associated with the keyword can include receiving at least one string within the electronic document that is associated with the portion of the keyword. The process 1000 can include detecting input corresponding to the entire keyword and sending (e.g., from the end-user device to the machine learning system) an additional request to determine one or more tokens within the electronic document that are associated with the entire keyword. The process 1000 can receive (e.g., at the client device from the machine learning system), based on the additional request, at least one additional string within the electronic document that is associated with the entire keyword.

At block 1006, the process 1000 includes sending the keyword and the set of tokens to a machine learning system. The machine learning system generates a representation of the keyword and a representation of each token within the set of unique tokens. In some examples, the machine learning system generates the feature vectors using a word embedding model trained to map semantic meanings of words to feature vectors. As noted herein, a representation of a string (e.g., a word or words, a phrase, one or more characters, or other text string) is generated based on contextual usage of the string in relation to other strings. In some cases, the representations may include feature vectors determined within a vector space. Strings (e.g., words) that have similar semantic meanings and/or contextual usage may correspond to feature vectors located nearby each other within the vector space, and strings that have dissimilar semantic meanings and/or contextual usage may correspond to feature vectors located far from each other within the vector space. For example, feature vectors of words that have similar contextual usage in the training data are closer together within the vector space than feature vectors of words that have dissimilar contextual usage in the training data.

In some examples, the input corresponding to the request to locate text within the electronic document that is associated with the keyword includes a number of characters of the keyword. For instance, the number of characters can include a partial set of characters of all characters of a word (e.g., "espion" for the word "espionage"). In some cases, the process 1000 includes sending the keyword and the set of tokens to the machine learning system in response to determining that the number of characters of the keyword exceeds a threshold number. For example, the threshold number of characters can include three characters, in which case the process 1000 can send the keyword and the set of tokens in response to detecting that three characters of a word have been entered (e.g., into the word search user interface). In some examples, the process 1000 can include detecting input corresponding to at least one additional character of the keyword and sending, to the machine learning system, the keyword that includes the additional character. The process 1000 can receive, from the machine learning system based on the keyword that includes the additional character, at least one additional string within the electronic document that is associated with the keyword. In some examples, the process 1000 includes sending the keyword and the set of tokens to the machine learning system in response to determining that input corresponding to an additional character of the keyword has not been detected within a threshold period of time following detection of input (e.g., into the word search user interface)

corresponding to a most recently provided character of the keyword. For example, the threshold period of time can include five seconds, in which case the process 1000 can send the keyword and the set of tokens in response to detecting that five seconds has passed since the input corresponding to the most recently provided character of the keyword.

In some examples, generating the model for determining representations of strings can includes training the model to determine feature vectors corresponding to strings within a vector space. As noted herein, feature vectors of strings that have similar contextual usage in the training data are closer together within the vector space than feature vectors of strings that have dissimilar contextual usage in the training data.

In some examples, the process 1000 can include forwarding a partial set of tokens of the electronic document before a complete set of tokens of the electronic document is generated. For instance, the machine learning system can determine at least one initial word within the electronic document that is associated with the keyword based on the partial set of tokens. The process 1000 can include forwarding the complete set of tokens once the complete set of tokens is generated. In such examples, the machine learning system can determine at least one additional word within the electronic document that is associated with the keyword based on the complete set of tokens.

At block 1008, the process 1000 includes receiving, from the machine learning system, at least one string (e.g., at least one word, phrase, etc.) within the electronic document that is associated with the keyword. The at least one string is associated with the keyword based on the representation of the keyword having at least a threshold similarity to a representation of a token corresponding to the at least one string. In some cases, the machine learning system determines a similarity between the representation of the keyword and each representation of each token within the set of tokens by determining a distance measurement between a feature vector corresponding to the keyword and a feature vector corresponding to each token within the set of tokens. For instance, the machine learning system can determine that the at least one string (e.g., word, etc.) is associated with the keyword based on a feature vector corresponding to the at least one string being less than a threshold distance from a feature vector corresponding to the keyword within the vector space. In some cases, the at least one string that is associated with the keyword does not include a string corresponding to the keyword. For example, the at least one string can include different characters (e.g., letters) than the characters of the keyword (e.g., the keyword can include the word "spy" and the at least one string can include the word "espionage").

At block 1010, the process 1000 includes outputting an indication of the at least one word that is associated with the keyword. In some cases, outputting the indication includes displaying the at least one string (e.g., word, phrase, etc.) within the word search user interface. In some examples, outputting the indication of the least one string that is associated with the keyword includes highlighting each instance of the at least one string within the electronic document. In some examples, outputting the indication of the at least one string that is associated with the keyword includes displaying the at least one string within a user interface via which a user provided input corresponding to the keyword (e.g., in the word search user interface). The process 1000 can determine and output an indication of any number of strings that are related to the keyword. For instance, the process 1000 includes determining that at least one additional string within the electronic document includes the string corresponding to the keyword, and outputting an additional indication of the at least one additional string.

Figure 11:
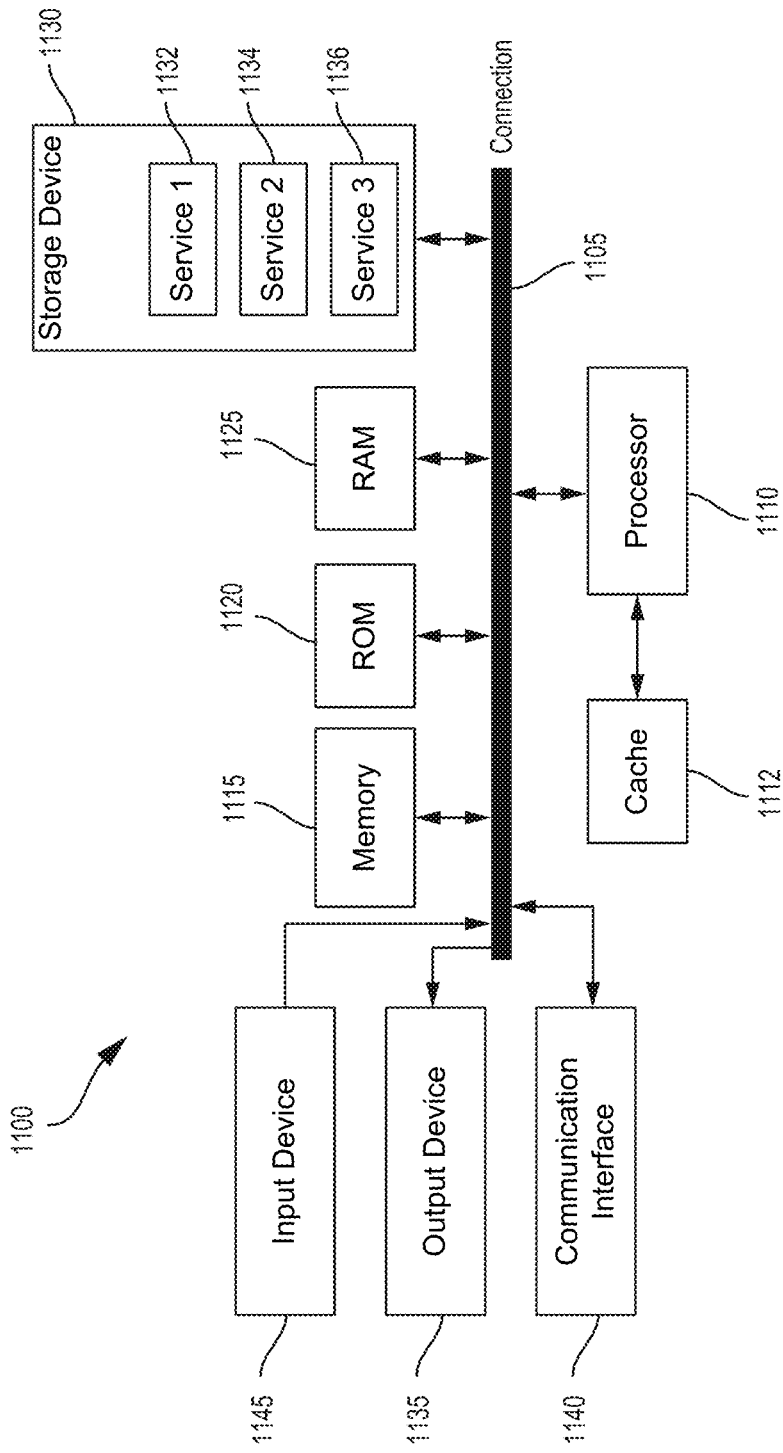
FIG. 11 is an example computing device architecture of an example computing device that can implement the various techniques described herein.

In some examples, the processes described herein (e.g., the process 800, the process 1000, and/or other process described herein) may be performed by a computing device or apparatus, such as a computing device having the computing device architecture 1100 shown in FIG. 11. In one example, the process 800 and/or process 1000 can be performed by a computing device with the computing device architecture 1100 implementing the semantic search systems 300, 400, and/or 500. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including the process 800 and/or process 1000. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 800 and 1000 are illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement the various techniques described herein. For example, the computing device architecture 1100 can implement the semantic search systems 300, 400, and/or 600 shown in FIGS. 3, 4, and 6, respectively. The components of computing device architecture 1100 are shown in electrical communication with each other using connection 1105, such as a bus. The example computing device architecture 1100 includes a processor 1110 (e.g., a CPU or other processing unit) and computing device connection 1105 that couples various computing device components including computing device memory 1115, such as read only memory (ROM) 1120 and random access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other modules can control or be configured to control processor 1110 to perform various actions. Other computing device memory 1115 may be available for use as well. Memory 1115 can include multiple different types of memory with different performance characteristics. Processor 1110 can include any general purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for model-based semantic text searches, comprising:
   detecting input corresponding to a request to locate text within an electronic document that is associated with a keyword included in the input, wherein the input includes a number of characters of the keyword;
   generating a set of tokens from the electronic document, each token corresponding to one or more strings within the electronic document;
   sending the keyword and the set of tokens to a machine learning system configured for semantic mapping in response to determining that input corresponding to an additional character of the keyword has not been detected within a threshold period of time following detection of input corresponding to a most recently provided character of the keyword, wherein the machine learning system generates a representation of the keyword, a representation of each token within the set of tokens, and a representation of a string based on contextual usage of the string in relation to other strings in training data;
   receiving, from the machine learning system, at least one string within the electronic document that is associated with the keyword, the at least one string being associated with the keyword based on the representation of the keyword having at least a threshold similarity to a representation of a token corresponding to the at least one string; and
   outputting an indication of the at least one string that is associated with the keyword.

2. The method of claim 1, further comprising detecting input prompting an application displaying the electronic document to open a word search user interface, wherein the input including the keyword is received from the word search user interface.

3. The method of claim 2, further comprising generating the set of tokens of the electronic document in response to detecting the input prompting the application to open the word search user interface.

4. The method of claim 1, wherein the input corresponding to the request to locate text within the electronic document that is associated with the keyword includes a number of characters of the keyword, and further comprising:
   sending the keyword and the set of tokens to the machine learning system in response to determining that the number of characters of the keyword exceeds a threshold number.

5. The method of claim 4, further comprising:
   detecting input corresponding to at least one additional character of the keyword;
   sending, to the machine learning system, the keyword that includes the additional character; and
   receiving, from the machine learning system based on the keyword that includes the additional character, at least one additional string within the electronic document that is associated with the keyword.

6. The method of claim 1, wherein representations generated by the machine learning system include feature vectors of words determined within a vector space, and wherein feature vectors of words that have similar contextual usage in the training data are closer together within the vector space than feature vectors of words that have dissimilar contextual usage in the training data.

7. The method of claim 6, wherein the machine learning system generates the feature vectors using a word embedding model trained to map semantic meanings of words to feature vectors.

8. The method of claim 1, wherein:
   generating the set of tokens of the electronic document includes generating the set of tokens on an end-user device displaying the electronic document; and
   sending the set of tokens to the machine learning system includes forwarding the set of tokens to a server external to the end-user device that implements the machine learning system.

9. The method of claim 1, wherein sending the set of tokens to the machine learning system includes:
   forwarding a partial set of tokens of the electronic document before a complete set of tokens of the electronic document is generated, wherein the machine learning system determines at least one initial word within the electronic document that is associated with the keyword based on the partial set of tokens; and
   forwarding the complete set of tokens once the complete set of tokens is generated, wherein the machine learning system determines at least one additional word within the electronic document that is associated with the keyword based on the complete set of tokens.

10. The method of claim 1, wherein outputting the indication of the least one string that is associated with the keyword includes highlighting each instance of the at least one string within the electronic document.

11. The method of claim 1, wherein outputting the indication of the at least one string that is associated with the keyword includes displaying the at least one string within a user interface via which a user provided input corresponding to the keyword.

12. The method of claim 1, wherein the at least one string that is associated with the keyword does not include a string corresponding to the keyword.

13. The method of claim 12, further comprising:
   determining that at least one additional string within the electronic document includes the string corresponding to the keyword; and
   outputting an additional indication of the at least one additional string.

14. An end-user device configured for model-based semantic text searches, comprising:
   one or more processors; and memory accessible to the one or more processors, the memory storing instructions, which upon execution by the one or more processors, cause the one or more processors to:
- detect, on the end-user device, input corresponding to a request to locate text within an electronic document that is associated with a keyword included in the input, wherein the input includes a number of characters of the keyword;
- generate, on the end-user device, a set of tokens from the electronic document, each token corresponding to one or more strings within the electronic document;
- send in response to determining that input corresponding to an additional character of the keyword has not been detected within a threshold period of time following detection of input corresponding to a most recently provided character of the keyword, from the end-user device to a machine learning system configured for semantic mapping hosted on a server external to the client device, a request to determine one or more tokens within the electronic document that are associated with the keyword based on determining tokens with representations that have at least a threshold similarity to a representation of the keyword;
- receive, at the end-user device from the machine learning system based on the request, at least one string within the electronic document that is associated with the keyword; and
- display, on the end-user device, an indication of the at least one string that is associated with the keyword.

15. The end-user device of claim 14, wherein:
the input corresponding to the request to locate text within the electronic document that is associated with the keyword includes a portion of the keyword;
sending, from the end-user device to the machine learning system, the request to determine the one or more tokens within the electronic document that are associated with the keyword includes sending a request to determine one or more tokens within the electronic document that are associated with the portion of the keyword;
receiving, at the end-user device from the machine learning system based on the request, the at least one string within the electronic document that is associated with the keyword includes receiving at least one string within the electronic document that is associated with the portion of the keyword, and further comprising:
detecting input corresponding to the entire keyword;
sending, from the end-user device to the machine learning system, an additional request to determine one or more tokens within the electronic document that are associated with the entire keyword; and
receiving, at the client device from the machine learning system based on the additional request, at least one additional string within the electronic document that is associated with the entire keyword.

* * * * *